V. A. BOKER.
TRACTION WHEEL.
APPLICATION FILED AUG. 27, 1917.

1,376,394.

Patented May 3, 1921.
2 SHEETS—SHEET 1.

WITNESSES
E. C. Wells
G. F. Williamson

INVENTOR
Vitus A. Boker
BY HIS ATTORNEYS
Williamson Michau

V. A. BOKER.
TRACTION WHEEL.
APPLICATION FILED AUG. 27, 1917.
1,376,394.
Patented May 3, 1921.
2 SHEETS—SHEET 2.
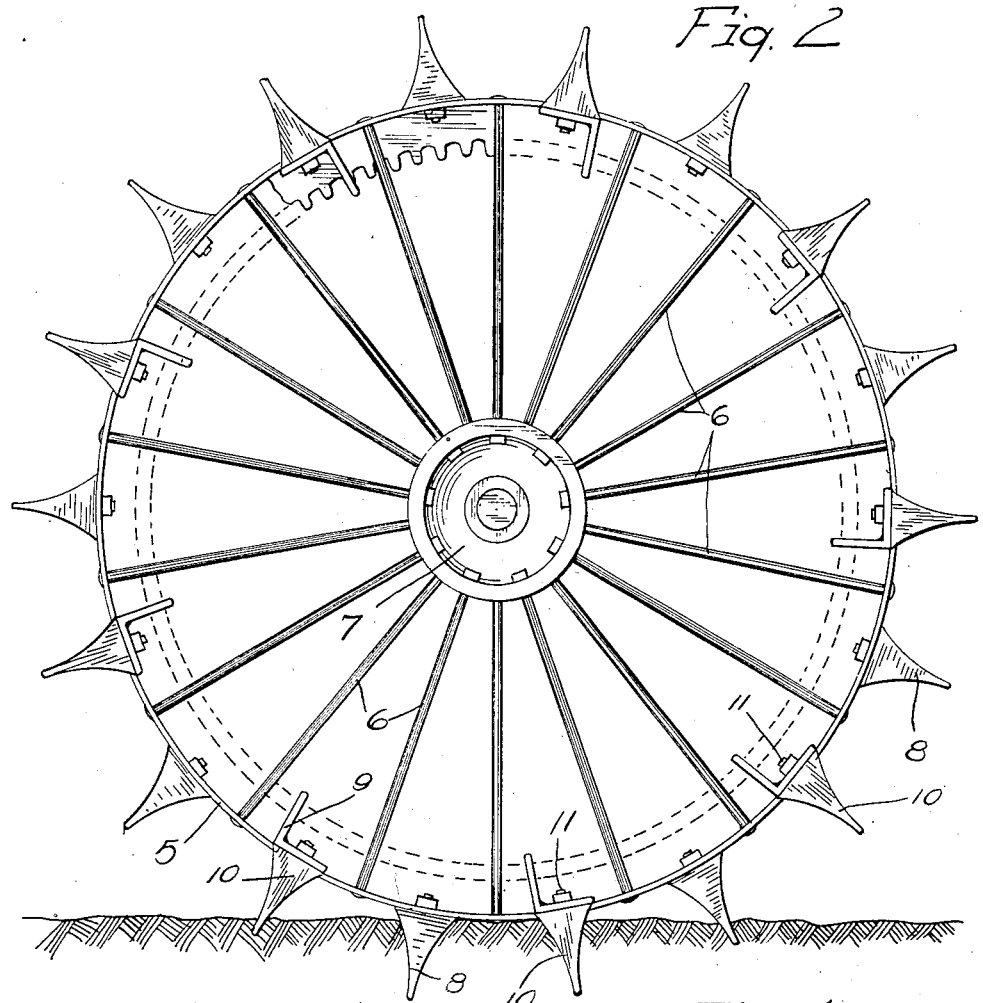
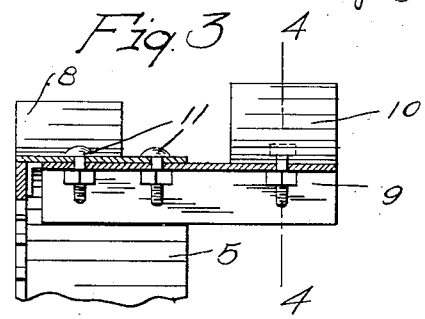
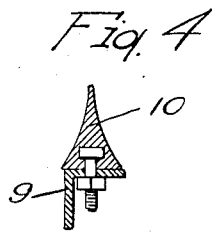
WITNESSES
E. C. Wells
G. F. Williamson
INVENTOR
Vitus A. Boker
BY HIS ATTORNEYS
Williamson Merchant

UNITED STATES PATENT OFFICE.

VITUS A. BOKER, OF MINNEAPOLIS, MINNESOTA.

TRACTION-WHEEL.

1,376,394.  Specification of Letters Patent.  Patented May 3, 1921.

Application filed August 27, 1917. Serial No. 188,285.

*To all whom it may concern:*

Be it known that I, VITUS A. BOKER, a citizen of the United States, residing at Minneapolis, in the county of Hennepin and State of Minnesota, have invented certain new and useful Improvements in Traction-Wheels; and I do hereby declare the following to be a full, clear, and exact description of the invention, such as will enable others skilled in the art to which it appertains to make and use the same.

My present invention relates to tractors and has for its object to provide an improved traction wheel which is especially adapted for use on soft ground; and to such ends, generally stated, the invention consists of the novel construction and combination of parts hereinafter described and defined in the claims.

In the use of tractors in mud, sand, or other soft soil, there has been great difficulty in obtaining the desired traction required to prevent spinning of the traction wheels. As is well known, when a traction wheel once starts spinning, it will frequently dig a hole in the ground making it impossible for the wheel to force itself out of the hole which it has dug. My invention provides an extremely simple and efficient auxiliary traction device, which, without adding greatly to the weight of the wheel nevertheless, very greatly increases its tractive action and makes spinning of the wheel impossible even in the softest ground upon which it is possible to drive any ordinary vehicle. The so-called auxiliary traction devices are in the form of bars, either permanently or detachably applied to the rim of a wheel, projecting, preferably but from one side thereof, and provided at their projecting ends with heavy traction lugs.

In the accompanying drawings which illustrate the invention, like characters indicate like parts throughout the several views.

Referring to the drawings:

Fig. 2 is a side elevation of the wheel;

Fig. 3 is a transverse section taken on the line 3—3 of Fig. 1; and

Fig. 4 is a section taken on the line 4—4 of Fig. 3.

Figure 1:
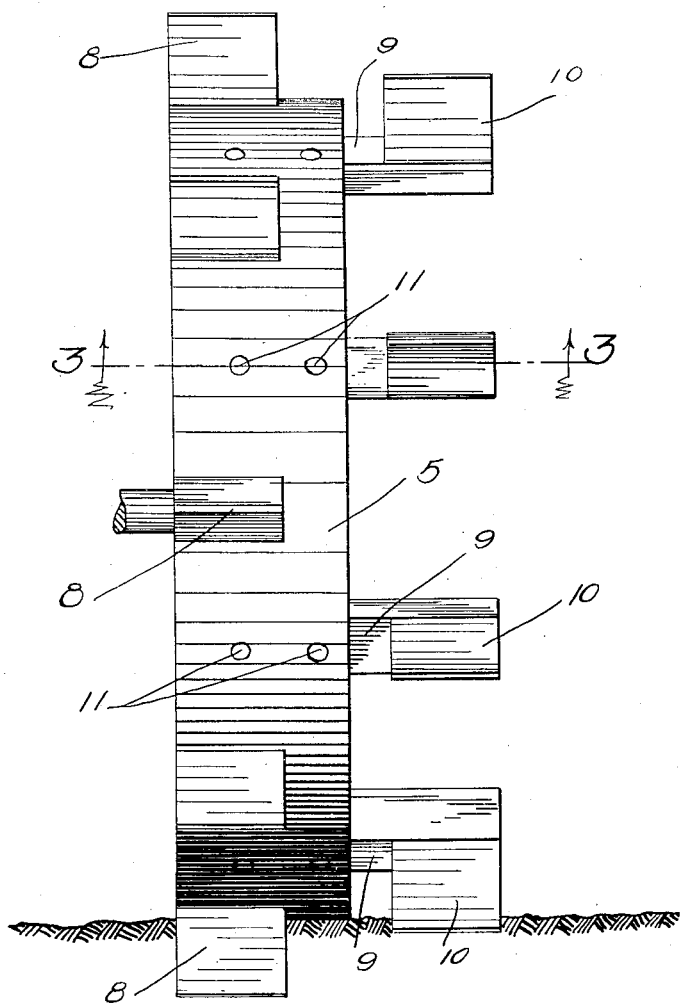
Figure 1 is a rear elevation of the improved traction wheel.

The numeral 5 indicates the flat rim, the numeral 6 the spokes and the numeral 7 the hub structure of a traction wheel which, except as hereinafter noted, may be of the usual or any suitable construction. The rim 5 is provided with heavy radially projecting traction lugs 8 bolted, or otherwise rigidly secured thereto, and preferably terminating inward of the outer edge of the said rim 5.

The wheel traction devices comprise traction bars 9 and heavy traction lugs 10. The traction bars 9 are preferably formed from commercial rolled steel cut to the desired length, and, as shown, there are angle bars having their outer flanges placed against the inner surface of the rim 5 and detachably, but rigidly connected thereto by nut-equipped bolts 11. The inwardly projecting flanges of these so-called traction bars 9 are arranged at that side which, under the tractive force applied to the wheel when the latter is rotated in a clock-wise direction with respect to Fig. 2, is in advance so that when the traction bar is forced down into the mud or soft ground, it will act as a blade to very materially increase the traction action. The traction lugs 8 and 10, of course, enter the ground and give very great traction. Preferably, the traction lugs 8 and 10 are spaced apart transversely of the wheel and are staggered circumferentially of the wheel. The staggered arrangement gives a maximum of lug engagement with the ground while the lateral spacing gives a better mud clearing action. Moreover, with the laterally projected traction bars, it is impossible for mud to collect between the auxiliary traction lugs 10, inasmuch as the mud will always be forced clear thereof and between the traction bars.

A wheel-equipped with traction devices as described, even if it should settle considerably into the soft ground, cannot possibly slip because the more it settles, the greater is the traction action produced by the inwardly projecting flanges of the traction bars.

The auxiliary traction bars may be quickly removed when their use is not desired, and moreover, the main traction lugs 8, themselves may be quickly removed to adapt the wheel to run on hard ground or road beds. In actual tests, this improved traction wheel is found to have exceedingly great traction and to thereby greatly increase the efficiency of tractors, such as used for plowing and other agricultural purposes.

What I claim is:

1. The combination with a traction wheel having a rim with main traction lugs thereon, of circumferentially spaced traction bars applied to said rim at points circumferentially between said main traction lug and projecting at one side of said rim, said bars being provided with radially projecting auxiliary traction lugs, said main and auxiliary traction lugs being spaced transversely of said wheel rim, to leave between said main and auxiliary lugs a lugless space extending in a direction around the wheel.

2. The combination with a wheel having main traction lugs, of traction bars detachably applied at one side of said rim at points circumferentially between the main traction lugs thereof, said traction bars having radially projecting auxiliary traction lugs, the said main traction lug terminating short of the edge of said rim and the said auxiliary traction lug terminating outwardly of the outer edge of said rim.

In testimony whereof I affix my signature in presence of two witnesses:

VITUS A. BOKER.

Witnesses:
CLARA DEMAREST,
BERNICE G. BAUMANN.